United States Patent [19]

Reiser et al.

[11] 3,864,469

[45] Feb. 4, 1975

[54] XANTHINES IN PHARMACEUTICAL PREPARATIONS AND FOR STABILIZATION OF VITAMINS

[75] Inventors: Mario Reiser; Lothar Nook, both of Wiesbaden; Emil Eidebenz, Mainz-Gonsenheim, all of Germany

[73] Assignee: Hoechst Aktiengesellschaft, Frankfurt am Main, Germany

[22] Filed: Feb. 8, 1973

[21] Appl. No.: 330,654

Related U.S. Application Data

[63] Continuation-in-part of Ser. No. 145,347, May 20, 1971, abandoned, which is a continuation-in-part of Ser. No. 782,462, Dec. 9, 1968, abandoned.

[30] Foreign Application Priority Data

Dec. 16, 1967 Germany.............................. 1617418

[52] U.S. Cl................... 424/22, 264/117, 264/126, 424/19, 424/201, 424/236, 424/237, 424/252, 424/253, 424/255, 424/263, 424/266, 424/280, 424/284, 424/344

[51] Int. Cl.. A61k 27/12, A61k 15/00, A61k 15/12

[58] Field of Search ........ 264/117, 126; 424/19, 22, 424/201, 236, 237, 252, 253, 255, 263, 266, 280, 284, 344

[56] References Cited

UNITED STATES PATENTS 2,953,493   9/1960   Schroeder et al................... 424/253
3,374,146   3/1968   Bucharz et al....................... 424/19
3,670,065   6/1972   Eriksson et al. ..................... 264/131

FOREIGN PATENTS OR APPLICATIONS 815,969   1/1959   Great Britain

*Primary Examiner*—Shep K. Rose
*Attorney, Agent, or Firm*—Irwin M. Aisenberg

[57] ABSTRACT

The invention relates to a process for the production of pharmaceutical preparations exhibiting delayed release of an active substance which comprises intimately mixing a more slowly absorbable therapeutically-active substance with one which is more rapidly absorbable, one of these therapeutically-active substances being present in the non-solid state in which the other one is homogeneously incorporated, solidifying the mixture obtained and forming it into a solid pharmaceutical preparation. The invention also relates to a process for the stabilization of vitamins in a mixture containing certain substituted xanthines which are also suitable in the afore-mentioned process by homogeneously incorporating one component in the other one which is in the non-solid state, and to preparations comprising a combination of a vitamin stabilized with one of said substituted xanthines.

28 Claims, 2 Drawing Figures

XANTHINES IN PHARMACEUTICAL PREPARATIONS AND FOR STABILIZATION OF VITAMINS

This application is a continuation-in-part of copending application Ser. No. 145,347, filed May 20, 1971, which is a continuation-in-part of application Ser. No. 782,462, filed Dec. 9, 1968 both now abandoned.

The invention relates to pharmaceutical preparations and particularly to those with delayed release of active substances and to the stabilisation of vitamins. It is known that vitamins are unstable.

Pharmaceutical preparations for oral use having delayed release of active substances may be manufactured by providing active substances, in the form of granulates or tablets with one or more coatings which are insoluble or only partially soluble in the gastric juices. The coatings may also contain active substances. Examples of such coatings are keratin, sparingly soluble fatty acid esters, gelatine capsules and lacquers, e.g., based on acrylic resins or the like. Preparations having several layers containing active substances, without these layers constituting complete coverings, may also be manufactured.

A delayed release may also be obtained by mixing the active substances with a high-molecular, swellable carrier substance, such as polyethylene, polyvinylpyrrolidone or polyvinyl chloride, which is however, insoluble in gastric juices. These carrier substances greatly delay the release of the active substance. The use of ion-exchange resins also delays the uptake of active substances in the gastro-intestinal tract.

In all the known pharmaceutical preparations the use of one or more additives or auxiliary substances is always necessary to bring about the delay. However, this is not desirable in every case because this results in an additional expense for adjusting the proportion of these substances and for the application for coatings or layers.

An object of the invention is to provide a process which is superior to the known process since it may be carried out with or without the use of an auxiliary substance with a delaying action. According to the invention there is provided a process for the production of a pharmaceutical preparation exhibiting delayed release of an active substance which comprises a. intimately mixing at least two therapeutically-active substances, at least one of which is more rapidly absorbable than another and at least one of which is in a non-solid state, each other therapeutically-active substance being homogeneously incorporated into any such substance in a non-solid state (as herein defined);

b. solidifying the resulting admixture and c. forming the solidified admixture into a solid pharmaceutical preparation, wherein each pharmaceutically-active substance is homogeneously admixed with any other such substance, the said at least two active substances being physiologically acceptable and as well pharmaceutically and chemically compatible under the conditions of the homogeneous incorporation and wherein their activities are not antagonistic, also for concurrent administration.

The term non-solid state as used herein means that the substance, under the conditions of mixing, has not a solid surface but one which is mobile, e.g., plastic, under these conditions. Preferably, however, under the mixing conditions the more rapidly and/or the more slowly absorbable substance is in the liquid state. It is also possible that non-liquid therapeutically-active substances absorbable at different rates are intimately mixed under pressure. The mixture is expediently brought into the form of a solid preparation by means of granulation. Three or more pharmaceutically active substances can also be intimately mixed with one another in accordance with the invention.

In this way a more rapidly acting substance can be delayed in its action by admixture with the second substance, i.e. the release of the rapidly acting active substance takes place over a longer period. This is particularly desirable if, e.g., a delayed action of one or more active substances has to be obtained for therapeutic reasons or if undesirable side effects e.g., irritation of the gastrointestinal tract, occurence of undesirable, sudden blood pressure changes, feverish feelings, etc., of individual constituents of the mixture are to be avoided by delaying the absorption of one or more active substances. According to the process of the invention a preparation may be obtained which is a combination of a plurality of physiologically-acceptable and pharmaceutically-compatible substances, at least one of which is more rapidly absorbable than one other and which substances do not react with any of the other ingredients under the conditions a) of intimately mixing and incorporation such as at the temperature employed, and wherein their activities are not antagonistic or incompatible.

The present invention is particularly applicable to compositions containing various physiologically-acceptable or pharmacologically-compatible xanthine compounds.

The present process is particularly suitable for the joint processing of nicotinic acid (pyridine-3-carboxylic acid) and/or its therapeutically active derivatives, such as salts, esters or amides, and/or suitably substituted xanthines, which are substituted in the 1-, 3- or 7-position by a hydrocarbon group with 2 or 3 to 20 C-atoms bound at an acyclic carbon atom, and are substituted in both the other stated positions with an alkyl group with 1 or 2 C-atoms, preferably a methyl group. Preferably the longer-chained group is in the 1- or 7-position. Suitable groups are substituted or unsubstituted straight- or branched-chain, saturated or mono- or poly-olefinically unsaturated hydrocarbon groups with from 2 or 3 to 20 carbon atoms; the unsubstituted hydrocarbon groups preferably have from 3 to 15 carbon atoms. The substituted groups have one or a plurality of the same or different substituents, but monosubstitution is preferred over polysubstitution. Any subtituent of a substituted group is hydroxy, oxo, phenyl or cycloalkyl having from 5 to 7 ring carbon atoms.

Illustrative alkyls include normal and branched-chain propyl, butyl, hexyl, octyl, lauryl and stearyl; specific branched alkyls are isobutyl, tertiary butyl and 2-ethylhexyl. Mono- and polyolefinically unsaturated groups are, e.g., $\Delta^1$- and $\Delta^2$-pentenyl, $\Delta^3$-octenyl, octadecen-9-yl, octadecadien-9,12-yl and octadecatrien-9,12,15-yl. Hydroxy substitution is provided, e.g. by $\beta$-hydroxyethyl, 5-hydroxyhexyl and 4,5-dihydroxyhexyl. The oxo substituent is reflected in keto groups in, e.g., 9-oxo-$\Delta^2$-decenyl, lauroyl, 5-oxohexyl and 3-oxoheptyl. Benzyl is an example wherein the sub stituent is phenyl and cyclohexyl is an example of cycloalkyl substitution.

The oxoalkyl-substituted dimethylxanthines may be prepared according to U.S. Pat. No. 3,422,107, the 1-(5-hydroxy-hexyl)-dimethylxanthine according to "Archiv der Pharmazie" vol. 299 (1966), page 455 and the other hydroxyalkyl-dimethylxanthines according to U.S. Pat. application Ser. No. 330,653 filed concurrently with this application. The benzyl-dimethyl xanthines may be prepared by reaction of 1,3- or 3,7-dimethyl xanthine with a benzyl halogenide, especially benzyl bromide.

The longer-chain groups generally have from 6 to 20, preferably 7 or 8 to 15, carbon atoms when they are hydroxyalkyl or oxoalkyl groups and they have altogether at most 20 carbon atoms when they are substituted by phenyl or cycloalkyl with 5 to 7 ring atoms.

Particularly advantageous in this connection is a combination of 1-hexyl-3,7-dimethylxanthine and nicotinic acid and/or its therapeutically active derivatives. Other suitable xanthine derivatives are 1-isoamyl-3,7-dimethylxanthine, 1-benzyl-3,7-dimethylxanthine, 1-(5-oxohexyl)-3,7-dimethylxanthine, 7-(5-oxohexyl)-1,3-dimethylxanthine and 7-(2-hydroxyethyl)-1,3-dimethylxanthine.

As in this combination the slowly absorbable component has the lower melting point; particularly favourable processing is obtained with a higher quantity of this component, e.g., a non-stabilizing excess thereof. Furthermore, such a proportion has also the advantage of particularly good therapeutic activity.

It is also possible to incorporate one or more vitamins, e.g., to combine vitamins A, B, such as $B_1$, $B_2$, $B_6$, C, D, such as $D_3$, or E or their salts with 1-hexyl-3,7-dimethylxanthine[+]. It was further found that the vitamins may be stabilized by intimately mixing at least one vitamin and at least one xanthine which is substituted as defined below, in which mixing procedure (a) at least one of the components is present in the non-solid state (as defined above) in which the other component is homogeneously incorporated, (b) at least 50 % of the weight of the combination of vitamins and xanthine compounds are present in the non-solid state (as defined above) in which the other part of the composition is homogeneously incorporated and (c) an excess of the xanthine compound is present, and by subsequently solidifying the mixture obtained and forming it into a substantially solid state, preferably by a granulation. The substitued xanthine is a xanthine, which is in 1-, 3- or 7-position substituted by a hydrocarbon group with 3 to 20 C-atoms bound at an acyclic carbon atom being a part of such group or is substituted by a hydroxyalkyl or oxoalkyl group of 6 to 20 C-atoms also bound at an acyclic carbon atom being a part of such group. The xanthine compound is also substituted in the other two of the 1-, 3- or 7-positions by an alkyl group of one or two C-atoms.

[+] or other dimethylxanthine derivatives

Preferably in this method at least one and possibly both of the components, i.e., a vitamin or a xanthine compound, is present in the liquid state under the mixing conditions. Of course further therapeutically active substances may be incorporated into the vitamin preparation. The ratio between the vitamins to be stabilized and the xanthine compound may vary within wide limits. Inter alia it is dependent on the desired biological effects of the vitamins and on the effects — if desired therapeutic effects — of the other components of the combination. It is also dependent on the physical properties, such as their melting points and their solidificaton points, of the various ingredients or of mixtures thereof. It is apparent that the xanthine compound is used at least in such an amount as is necessary in order to achieve a sufficient stabilisation of the vitamin. Thus, the alkyl-dimethyl xanthine compound may be present in an amount of from 50 to 200 and the nicotinic acid or its salt in an amount of from 10 to 50 *).

If it is intended to achieve in addition a therapeutic effect of the xanthine compound, suitably a relatively great excess of the xanthine compound will be used, and it is well possible to adjust this therapeutic effect to the intended effect of the vitamins. If a relatively high-melting xanthine compound is used, for example those melting above 80°C, it is of course advisable to process such compounds only with such vitamins which per se endure such temperatures. Preferably the ratio of vitamins to xanthines is at most 30 % by weight. In addition to the stabilization of the vitamins a further effect may be achieved which consists of delaying the release of the vitamins and, if desired, of other therapeutically-active substances from the composition dependent on the rate with which the employed xanthine compound is dissolved and resorbed in the gastrointestinal tract, i.e., the release of the active compound occurs during a prolonged period of time. This is particularly desired if a prolonged effect of a vitamin is to be achieved, e.g., for therapeutic reasons.

*) parts by weight each.

The stabilization of the vitamins achieved according to the invention is also surprisingly observed if no stabilizers (which hitherto were usually used for stabilizing vitamins) are added. A use of such stabilizers may however be of advantage in some cases in order to improve the stabilizing effect.

The stabilization of the vitamins achieved according to the invention is particularly surprising since it is not only achieved in admixtures with indifferent excipients, but also in complex pharmaceutical compositions, i.e., those which also contain a number of compounds of different chemical structures.

Suitable substituted xanthines are those which are substituted in each of two of the 1-, 3- and 7-positions by an alkyl group having at most 2 carbon atoms and is substituted in the remaining of said positions by
  a. an aliphatic unsubstituted hydrocarbon group with 2 to 20 carbon atoms and saturated or olefinically unsaturated and containing at most 3 olefinic bonds,
  b. a substitution product of a) having a hydrocarbon group at least one substituent of which is selected from the group consisting of
    (1) hydroxy and (2) oxo, (each substituted hydrocarbon group having from 2 to 20 carbon atoms), (3) phenyl and (4) cycloalkyl with 5 to 7 ring atoms, each substituted hydrocarbon group having altogether at most 20 carbon atoms, wherein all substituents of the xanthine are bound therto by an acyclic carbon atom which is part of said substituents.

Those having a hydrocarbon group, particularly an acyclic hydrocarbon group containing from 2 to 15 C-atoms and in which the two other groups are an ethyl or preferably a methyl group, are preferred for the stabilization of vitamins. In the stabilization of vitamins it is also particularly suitable to combine 1-hexyl-3,7-dimethylxanthine and nicotinic acid and/or its therapeutically active equivalents, such as salts, e.g., the sodium or magnesium salt, esters and amides, e.g., the nicotinic acid amide, as far as these nicotinic compounds are solid and physiologically compatible.

According to the invention the vitamins are, for example, stabilized towards oxidative actions and influences of light. The invention applies to water-soluble as to lipoid-soluble vitamins per se or their therapeutically active equivalents, e.g., salts, esters or provitamins, for example for vitamins A, C and E and particularly for the B-vitamins. Of course mixtures of a plurality of vitamins may also be stabilized according to the invention. Where xanthines of a stabilizing action are not present or are present in an insufficient amount, the same vitamins or their equivalents may be incorporated as a therapeutically active substance in a pharmaceutical preparation, e.g., as a third or further ingredient.

The preparations or vitamin combinations obtained according to the invention are particularly intended for oral administration; however, other modes of administration, e.g., rectal, are also possible.

The active substances - or the ingredients of a vitamin combination - absorbable at different rates may be intimately mixed in the form of a melt. On the other hand it is also possible to mix intimately solid or semisolid e.g., pasty, substances under pressure, if desired at an elevated temperature. This can, e.g., take place by processing on friction rollers or in a screw extruder or the like. The pressure which occurs together with the friction brings about an intimate, mutual mixing. Subsequent coating of a carrier is also possible or the coating of one active substance with the other if the physical properties of the two substances permit it.

The selection of the substance into which other substance is to be worked depends on melting points and relative proportions. As a rule higher melting components are worked into lower melting components, in solid or also liquid form. This is particularly favourable when the proportion of lower melting components is greater. It is also possible to mix a three component system, e.g., by melting the component with the median melting point and working the other two components into it, especially if the lowest-melting substance is present only in a relatively small proportion. If mixing takes place by impregnation, one generally uses a larger amount of the higher-melting component, with which the liquid or softened lower-melting components are mixed. Suitably the homogeneous mixture is hardened by cooling, e.g., by means of cooling strips or cooling rollers in order to bring about a rapid and therefore uniform hardening.

Although it is not necessary, the products obtained according to the invention can be processed with processing excipients which are per se therapeutically inactive, and also do not or hardly impair the stabilization of the vitamins. Suitable excipients are, e.g., lactose, mannitol, talc or also substances (e.g., milk, protein, starch, gelatine, cellulose or their derivatives such as methyl cellulose, hydroxyethyl cellulose or suitable copolymers having a swelling or non-swelling action) having a swelling action. By means of such excipients (which can be added in larger or smaller proportions) the disintegration of the preparation and therefore the release of the active substance can be influenced still further. Thereby an additional depot action, i.e., a delayed release effect, can be obtained. A similar action can also be obtained by further coating the solid pharmaceutical preparation, e.g., as a granulate obtained according to the invention with a physiologically acceptable covering, e.g., a lacquer, such as one derived from a polymerized or condensed resin. This is of course also possible with preparations containing vitamins stabilized according to the invention.

On the other hand conventional additives, such as colloidal silicic acid, starch, surface active substances, e.g., glycerin esters of fatty acids having 12 to 20 carbon atoms, long-chained alcohols having 12 to 22 carbon atoms, e.g., cetyl alcohol, or waxes, e.g., esters of fatty acids having 12 to 30 carbon atoms with alcohols having 12 to 35 carbon atoms, which prevent a premature solidification during hardening of the melted mixture, may also be included. It is also possible to mix the granulate with at least one further therapeutically active substance, not treated according to the invention, and which, if desired, is already present as a component in the granulate. Thus, the time action of the medicine can be varied in such a way that one part of this component becomes rapidly active whereas the other part only becomes active after some delay.

Compositions of this invention are administered, e.g., orally in doses which depend on the particular active ingredient(s) therein. Each physiologically active ingredient can be administered in these compositions to a host in the same doses, in the same manner and for the same purposes as the ingredient is otherwise administered as long as no composition is administered to any subject at a constituent dosage level at which the constituent is toxic to the host. The toxicity of each active ingredient in the subject compositions is not significantly higher than that of the same active ingredient when administered in other compositions as the sole active ingredient.

Every pharmaceutically-acceptable xanthine as herein defined is useful for stabilizing every absorbable vitamin according to the process of this invention. When the vitamin can withstand (without deterioration) the temperature at which the selected xanthine melts, the vitamin is preferably thoroughly and homogeneously mixed with a xanthine melt.

The granulation of the vitamins or vitamin preparations, stabilized according to the invention, can take place in known manner. The granulate can be administered as such or processed into other pharmaceutical forms, e.g., capsules, tablets, dragees or the like. During processing in to capsules and if desired, tablets or dragees, once again an additional delaying action can be obtained, e.g., by the use of the capsule or by providing the tablets or dragees with an additional covering. It is also possible to compress the granulate into tablets and then to coat them. By using the invention, it is possible to control the active substance release time within wide limits. For example, the release can be delayed for a period up to 12 hours. Thereby it is also possible to control the end of active substance release.

All of the compositions according to this invention are useful in the same manner and for the same purposes as corresponding compositions having the same content of physiologically active component (other than the xanthine component), i.e., with due regard to delayed release of the active component. Delayed release medicaments have long been known; their value and application are well known and understood by those skilled in the subject art.

Vitamin compositions prepared according to the invention show such a good stabilization that even after one year of storage at a temperature of up to and exceeding 40°C no loss of the vitamin content could be observed. Contrary thereto vitamin compositions obtained by usual mixing have an essentially inferior stability. Thus, they may already be destroyed after storage for some weeks.

In order that the invention may be well understood the following examples are given by way of illustration only:

EXAMPLE 1

200 g of 1-hexyl-3,7-dimethylxanthine (perfusion increasing) are melted and maintained at a temperature of 90°C. Into this melt 50 g of nicotinic acid (3-pyridine carboxylic acid, perfusion increasing, vitamin) are homogeneously mixed with a suitable agitator. At above the solidification point, the mixture is poured out and allowed to solidify into blocks or into thin layer, and then granulated in known manner. The granulate can be used as such, or can be encapsulated. It can also, however, be formed into shaped articles, e.g. tablets, in the following manner:

250 g of the granulate are dusted with 25 g of starch and 25 g of a mixture of talc, colloidal silicic acid and magnesium stearate and compressed into round, biconvex tablets of 10 mm diameter and a weight of 300 mg. These tablets release the nicotinic acid, especially, only slowly over a period of several hours, that is with a greatly delayed action. The preparation effects an increase of the perfusion and vasodilatation.

Alternatively, the homogeneous composition may also be prepared by homogenization on a friction roller under pressure, eventually at an elevated temperature, or in a screw extruder.

EXAMPLE 2

200 g of 1-hexyl-3,7-dimethylxanthine are melted until clear and 20 g of 3-dimethylamino-1-phenyl-1-p-tolypropane hydrochloride (antihistaminicum, antialergicum) and 50 g of nicotinic acid are homogeneously distributed therein at a temperature of approximately 80° to 90°C. Following the procedure of Example 1, a granulate is again obtained which releases the active substances with a delayed action. The preparation is suitable as an antiasthmaticum and as a bronchospasmolyticum.

EXAMPLE 3

200 g of 1-hexyl-3,7-dimethylxanthine and 50 g of nicotinic acid are homogeneously mixed and processed on a heated friction roller under conditions wherein the xanthine derivative is molten. A flaky product is obtained having the same characteristics as the product of Example 1. Alternatively the pulverulent mixture can be processed by a screw extruder wherein the frictional heat causes the 1-hexyl-3,7-dimethylxanthine to melt whereby the nicotinic acid is homogeneously distributed. A heatable kneader operating under pressure which is equipped with sigma-type blades, also produces a product with a delayed release action. The therapeutic properties are analogous to those of the product of Example 1.

EXAMPLE 4

50 g of nicotinic acid are mixed with a clear melt of 150 g of 1-isoamyl-3,7-dimethylxanthine (perfusion increasing) at about 110° to 120°C. Further processing is as in Example 1 to yield granulates or tablets which release the active substances with a delayed action. The therapeutic properties are analogous to those of the product of Example 1.

EXAMPLE 5

200 g of 1-hexyl-3,7-dimethylxanthine (coronary vessel dilating, central sedativum) are melted until clear and 50 g of magnesium nicotinate and subsequently a mixture of 2.5 million. I.U. of vitamin A-acetate in 20 g of α-tocopherol acetate (vitamin E) are mixed in. After cooling the melt, the mixture present in the solid phase is processed to a granulate and, if desired, to further pharmaceutical forms, e.g., tablets, dragees or the like, from which there is a delayed release of the active substances. Surprisingly, the vitamins A and E are also stabilized in the mixture. The preparation is a combination of vitamins which also effects the dilatation of coronary vessels. It is also suitable as a geroprophylaxis.

EXAMPLE 6

200 g of 1-hexyl-3,7-dimethyxanthine are melted until clear and 50 g of magnesium nicotinate are mixed in. A granulate is produced from the solidified melt and 2.5 million. I.U. of vitamin A and 20 g of α-tocopherol (vitamin E), each in the form of a granulate, are mixed therewith. The mixed granulate obtained can be administered as such processed to pressed articles. Here again there is a delayed release of the active substances. The stability of vitamins A and E is also improved, even if not to the extent of Example 5. The therapeutic properties are analogous to those of the product of Example 5.

EXAMPLE 7

50 g of 1-hexyl-3,7-dimethyxanthine are melted until clear and 50 g of calcium nicotinate (perfusion increasing) are mixed in. Thereby a highly viscous suspension is formed which is allowed to cool. After solidification the mixture is granulated; the granulate is then compressed into tablets of 250 mg with 100 g of 1-hexyl-3,7-dimethylxanthine and tabletting additives, such as maize starch, talc and magnesium stearate. The product exhibits a delayed release of the active substances. It is a preparation which increases perfusion.

EXAMPLE 8

500 g of a melt produced in the manner described in example 1 are mixed with 50 g of one or more compounds, such as hydroxyethyl cellulose (working additive), having a swelling action; then 15 g of a lubricant, such as talc, are admixed thereto and the mixture is compressed into tablets or kernels of dragees. Binding agents, such as gelatine, polyacrylates, polyethylene glycol and polyvinyl pyrrolidone, may also be added to the composition. The solid phermaceutical preparation releases the active substances with a substantial delay. The therapeutic properties are analogous to those of the product of Example 1.

EXAMPLE 9

200 g of 1-hexyl-3,7-dimethylxanthine are melted together with 50 g cetyl alcohol (working auxiliary additive) at about 90°C and 50 g of nicotinic acid are then suspended in the melt. The mass is allowed to solidify and a granulate is prepared therefrom which may be processed while using conventional tabletting additives to yield solid pharmaceutical preparations or which may be filled into capsules.

The active substances are released from the solid pharmaceutical preparations in the course of 8 to 10 hours. By adding substances having a swelling action, the release of the active substances may be still further delayed. The therapeutic properties are analogous to those of the product of Example 1.

EXAMPLE 10

100 g of 1-hexyl-3,7-dimethylxanthine were melted at about 85°C. 20 g of magnesium nicotinate, 10 g of sodium ascorbate (vitamin C) and 10 g of vitamin $B_1$ are then suspended in the melt. The melt or suspension, respectively, is then caused to solidify. The solid mass is processed to a granulate in conventional manner. This granulate can be administered per se when filled in capsules or after having been compressed to solid pharmaceutical preparations. After 6 months almost no loss of the vitamin content is observed with these pharmaceutical preparations. The preparation is a combination with vitamins which also increases perfusion.

EXAMPLE 11

2 g of vitamin A palmitate are suspended in the melt of 100 g of 1-hexyl-3,7-dimethylxanthine having a temperature of 85°C. The composition is further processed as described in Example 10. The vitamin A palmitate shows a remarkable stability in the pharmaceutical preparations produced. After storing for 6 months, no noticeable loss of vitamin A can be determined. The properties of the preparation are analogous to those of the product of Example 10.

EXAMPLE 12

10 g of magnesium nicotinate, 2 g of vitamin $B_6$, 5 g of sodium ascorbate and 5 g of d,l-α-tocopherol-succinate are suspended in a melt of 100 g of 1-hexyl-3,7-dimethylxanthine, having a temperature of 85°C. The mixture is further processed as described in Example 10. After 6 months no noticeable reduction of the vitamin content can be determined. The properties of the preparation are analogous to those of the product of Example 10.

EXAMPLE 13

200 g of 1-hexyl-3,7-dimethylxanthine are molten to a limpid melt. A solid mixture of vitamin C, vitamin A, vitamin E, vitamin $B_1$, vitamin $B_6$, vitamin $B_2$, and vitamin $B_{12}$ is then distributed in the melt in such a ratio by weight that 1 g of the total melt contains the below-mentioned amounts of vitamins. After cooling and solidification of the melt, the mixture is worked up to form a granulate. The granulate shows good stabilization of the vitamins.

Stabilization test

The results of the analysis of the starting mixture and the mixture after a storage of ten months at ambient temperature are as follows:

|  | Analysis of the starting mixture | Analysis after storage (10 months) |
|---|---|---|
| vitamin C | 76.9 mg/g | 74.8 mg/g |
| vitamin A | 6160 i.u./g | 6990 i.u./g |
| vitamin E | 74.2 mg/g | 74.6 mg/g |
| vitamin $B_1$ | 4.2 mg/g | 4.25 mg/g |
| vitamin $B_6$ | 7.2 mg/g | 7.03 mg/g |
| vitamin $B_2$ | 6.58 mg/g | 6.58 mg/g |
| vitamin $B_{12}$ | 7.03 mcg/g | 6.90 mcg/g | mcg = microgram
i.u. = international units

EXAMPLE 14

A mixture of vitamin $B_1$, vitamin E, and vitamin A is added to a melt of 100 g of 1-hexyl-3,7-dimethylxanthine and the obtained mixture is worked up as described in Example 16. The amount of vitamins per gram of the total melt is shown in the table below.

Stabilization test

The results of the analysis of the starting mixture and the mixture after a storage of six months at ambient temperature are as follows:

|  | Analysis of the starting mixture | Analysis after storage (6 months) |
|---|---|---|
| vitamin $B_1$ | 5.87 mg/g | 5.92 mg/g |
| vitamin E | 66.8 mg/g | 67.6 mg/g |
| vitamin A | 9525 i.u./g | 9070 i.u./g |

EXAMPLE 15

1-hexyl-3,7-dimethylxanthine is molten at a temperature of 85°C. In this melt such an amount of vitamins C, $B_1$, $B_2$, and of magnesium nicotinate is suspended that each capsule of the finally obtained granulate contains the quantities as mentioned in the table below. The melt is then solidified and worked up to form a granulate. This granulate is filled into capsules containing the usual auxiliary materials, e.g., silicic acid and magnesium stearate, and additionally those amounts of active materials as mentioned in "starting mixture."

Stabilization test

The results of the analysis of the starting materials and of the mixture after a storage time of seven months at ambient temperature are as follows:

|  | Analysis of the starting mixture[+] | Analysis after storage (7 months)[+] |
|---|---|---|
| 1-hexyl-3,7-dimethylxanthine | 201.6 mg | 219.0 mg |
| vitamin C | 34.3 mg | 34.6 mg |
| vitamin $B_1$ | 1.54 mg | 1.54 mg |
| vitamin $B_2$ | 2.17 mg | 2.20 mg |
| magnesium nicotinate | 52.7 mg | 50.7 mg |

[+] in each capsule

The differences of the amounts in comparing the starting mixtures and the mixtures after storage are within the analytic limits of error.

As it is evident from the Examples 16 to 18, good stabilization of the vitamins is obtained in any case.

EXAMPLE 16

7.0 g of 1-hexyl-3,7-dimethylxanthine are molten at a temperature of 80°C. 1.5 g of 7-(5'-oxohexyl)-1,3-dimethylxanthine are added to the melt. A clear melt in which 1.5 g of nicotinic acid are suspended is obtained. After solidification, the mass is worked up to a granulate which is useful for the treatment of circulation diseases, especially of peripheric perfusion disorders.

The compositions prepared according to the present invention containing 1-hexyl-3,7-dimethylxanthine and nicotinic acid as sole therapeutically active substances are tested in comparison with analogous compositions with the same therapeutically active substances being present in the same quantity but in which compositions the active substances were only present in a mixture and not homogeneously incorporated in each other.

In the following the compositions prepared according to the invention are called the preparation A, the others are called preparation B. In these tests two tablets of a preparation A containing 400 mg of 1-hexyl-3,7-dimethylxanthine and 100 g of nicotinic acid are administered to two male persons who did not consume any caffeine for the last 3 days before the administration of said preparation. Within zero to 24 hours after administration the total urine of three hours for each was collected. After three further days without the consumption of caffeine the corresponding preparation B containing 400 mg of 1-hexyl-3,7-dimethylxanthine and 100 g of nicotinic acid were administered to the same persons. The urine was also collected within the same time and at the same intervals. The single urine samples were worked up as follows:

The excreted 1-hexyl-3,7-dimethylxanthine and its reaction products (metabolite) were isolated from these urine portions collected over 3-hour periods. These urine portions were adjusted to a pH value of 1 to 2 by adding 2N sulfuric acid; subsequently they were extracted with 10 × 20 ml of (freshly distilled) chloroform. The united chloroform extracts were washed one time each with 5 ml of 0.1 n sodium hydroxide and water. After this processing the chloroform phase contains original dimethylxanthine and its reaction products I to III as mentioned below. The extracts were concentrated in vacuo and subsequently they were dissolved in chloroform. A certain part of the solutions was etherified by bistrimethylsilyl-acetamide. Both solutions were tested by means of gas chromatography in a gas chromatograph of the "Varian 1520 B" type. The temperature of the stove was 185°C (isotherm) that of the injector was 280°C; and that of the detector was 315°C. The length of the column was 180 cm, its diameter was one-eighth inch. The stationary phase was 2 % XE 60, the support was type "Aeropak 30" of the particle size 100 to 200 mesh. The detector was a flame ionisation detector.

The result of this analysis is that the extract contains unreacted 1-hexyl-3,7-dimethylxanthine and its following reaction products (metabolite):

1. 1-(5'-oxohexyl)-3,7-dimethylxanthine (I)
2. 1-(5'-hydroxyhexyl)-3,7-dimethylxanthine (II)
3. 1-(4',5'-dihydroxyhexyl)-3,7-dimethylxanthine (III)

The found quantities of these reaction products were summarized and this total amount is referred to 400 mg of the original 1-hexyl-3,7-dimethylxanthine. In using preparation A 26.9 mg of the original dimethylxanthine were found in the form of the reaction products and in the case of the application of preparation B 28.0 mg of the 1-hexyl-3,7-dimethylxanthine were found as its reaction products.

Figure 1:
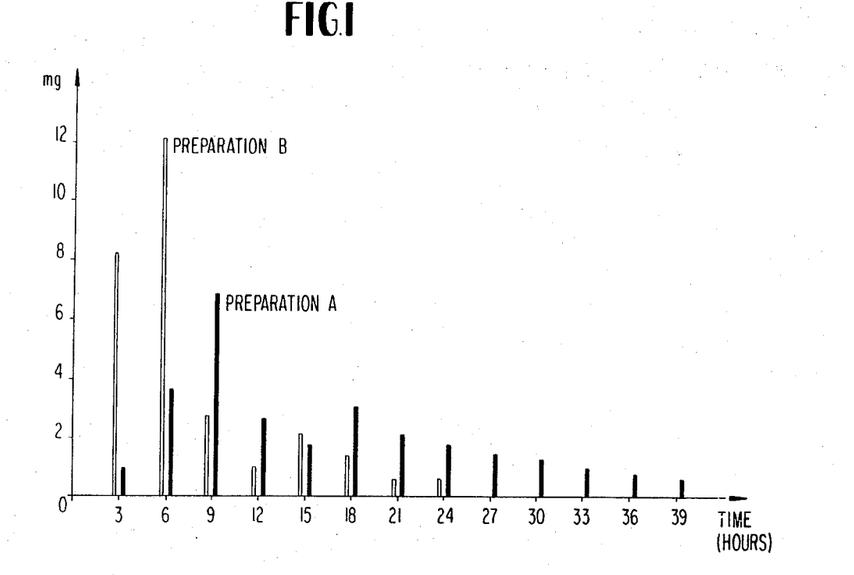

The test results are evident from FIG. 1 in which the quantity of the metabolites in mg is represented as a function of the time (hours). The black columns illustrate preparation A, the white columns preparation B.

It is obvious therefrom that the excretion of the metabolites of the comparison preparation B is finished after 24 hours. Contrary thereto after the application of preparation A the xanthine derivatives (metabolites) are still detectable after 49 hours. Furthermore the weight of the excretion within the considered time is more uniform.

Figure 2:
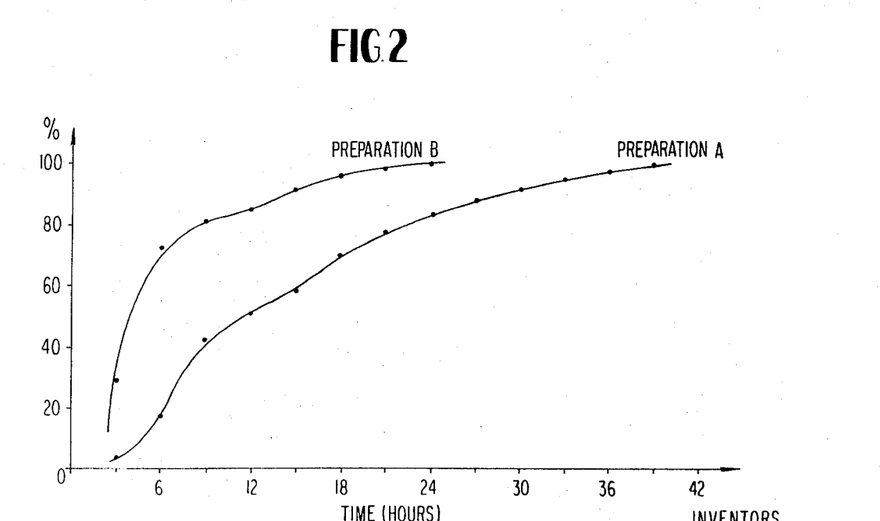

The test results are further evident from FIG. 2 in which the quantity of the metabolites in per cent of the original 1-hexyl-3,7-dimethylxanthine are plotted as a function of the time (in hours). It is evident from FIG. 2 that within 6 hours after the application of preparation B about 20 % of the original xanthine compound have been excreted. Contrary thereto within the same time only about 17 % of the original xanthine compound is excreted after the application of preparation A. Only after 18 hours is about 17 % of the original xanthine also excreted in the case of preparation A.

It is evident from the comparison tests that the therapeutically active substances of preparation A have a distinctively delayed release. Thus, there is a difference of 12 to 15 hours of the release of active substances of these two preparations.

EXAMPLE 17

150 g of 1-isoamyl-3,7-dimethylxanthine (melting point 110° C), prepared from isoamyl bromide and 1-sodium-3,7-dimethylxanthine, are molten in an oil bath at a temperature of about 120° C to a limpid melt. Therein 2 g of Vitamin $B_6$ and 5 g of sodium ascorbate are suspended. Above the solidification point the mixture is poured out to solidify in blocks or in a thin layer. After the solidification the material is granulated in a conventional manner. The obtained preparation is immediately applicable. It is a preparation increasing the blood circulation and also effective as a geriatricum.

EXAMPLE 18

70 g of 1-hexyl-3,7-dimethylxanthine are molten at 80° C. 15 g of 7-(5-oxohexyl)-1,3-dimethylxanthine (prepared according to U.S. Pat. No. 3,422,107) are added. A limpid melt is obtained in which 2 g of Vitamin $B_1$, 5 g of sodium ascorbate and 2 of Vitamin A palmitate are suspended. After solidification the mass is processed to form a granulate which is suitable for the treatment of peripheric and cerebral disorders of blood circulation.

EXAMPLE 19

100 g of 1-lauryl-3,7-dimethylxanthine, prepared from lauryl bromide and 1-sodium-3,7-dimethylxanthine, are molten at about 75° C. 2 g of Vitamin $B_1$ and 2 g of Vitamin A palmitate are suspended in the melt. After cooling to ambient temperature the solid mass is processed to form granules. The preparation is suitable for treatment of blood circulation disorders.

EXAMPLE 20

100 g of 1-(5-oxohexyl)-3,7-dimethylxanthine, prepared according to U.S. Pat. No. 3,422,107, are molten at 110° C. In this melt 15 g of magnesium nicotinate, 2 g of Vitamin $B_1$ chlorohydrate and 5 g of Vitamin A palmitate are suspended. Subsequently, the mixture is solidified and granulated. The granulate is processed to pharmaceutical shaped bodies. The preparation is suitable for treatment of cerebral and peripheric disorders, of blood circulation disorders of the eye and of geriatric disorders.

EXAMPLE 21

10 g of 1-(5-hydroxyhexyl)-3,7-dimethylxanthine are molten at 125°C. In this melt 2 g of Vitamin $B_2$ and 1.5 g of Vitamin $B_1$ chlorohydrate are suspended. After cooling to ambient temperature, the resulting solid mass is granulated and, after addition of auxiliary substances, e.g., starch and talcum, is processed to obtain a solid pharmaceutical shaped body. The thus-produced preparation, containing stabilized vitamins, is suitable for treating disorders of blood circulation and as a geriatricum.

EXAMPLE 22

Melt 100 g of 1-hexyl-3,7-dimethylxanthine at 80°C and suspend 2 g of Vitamin $B_2$ and 1.5 g of Vitamin $B_1$ chlorohydrate in the resulting melt.

Solidify the melt to obtain a granulate. Process the granulate to preparations useful in treating blood circulation disorders and in geriatrics.

Comparison tests

Various mixtures (some quantities of the same components in each direct comparison) were processed to form pharmaceutical preparations according to two different methods: 1. according to the process of the invention in the melt slightly above the melting temperature of the xanthine compound and 2. By mixing the components in a suitable mixing apparatus. The preparation according to the first-mentioned method was in accordance with that of example 10 (cf samples Ia, IIa, IIIa, and IIIc) and Example 20 (sample IVa) of the present application. During the second process type care was taken to obtain a homogeneous mixture. The test results are evident from the following tables.

In the tables the fluctuation measurement is the difference between the highest and the lowest deviation from theoretical values. The total fluctuation measurement is caused by the nonhomogeneity, loss of the therapeutically-active substances or vitamins, respectively, and by differences of analysis.

The total fluctuation measurement is a measure of homogeneity of the preparation. The higher value of this deviation, the lower the homogeneity. An essential quantity loss of theoretical value which increases from the starting value via 6 months to 1 or 2 years, indicates the instability of the therapeutically-active substance or the vitamin, respectively.

In sampel IIIc) a higher stabilization is effected by an increased quantity of the xanthine compound.

Samples Va) and b) are commercial products.

The experiments were performed only with commercial vitamins. They had no declaration whether they are stabilized or not.

Sample I

| | (a) MELT (invention): | (1-Hexyl-3,7-dimethylxanthine (SK$_7$) + Vitamin D$_3$ cryst. + Vitamin A palmitate (encapsulated) | | | | B) MIXTURE (comparison test): components as those of a) | | | | | |
|---|---|---|---|---|---|---|---|---|---|---|---|
| Storage time | SK$_7$ mg | % | Vit.D$_3$ cryst. mg | % | Vit.A-palm. i.u. | % | SK$_7$ mg | % | Vit.D$_3$ cryst. mg | % | Vit.A-palm. i.u. | % |
| Theory | 50.0 | | 0.025 | | 5000 | | 50.0 | | 0.025 | | 5000 | |
| Starting value | 50.4 | +0.8 | 0.022 | −12 | 4060 | −18.8 | 49.6 | −0.8 | 0.015 | −40 | 4120 | −17.6 |
| 6 Months | 51.5 | +3.0 | 0.022 | −12 | 3820 | −23.6 | 50.8 | +1.6 | 0.011 | −56 | 4420 | −11.6 |
| 1 Year | 50.9 | +1.8 | 0.020 | −20 | 3800 | −24.0 | 50.5 | +1.0 | 0.0125 | −50 | 3650 | −27.0 |
| Loss | | | −20% | | −24.0% | | | | −50% | | −27.0% | |
| Fluctuation Measurement | +3.0 +0.8 | | −12 −20 | | −18.8 −24.0 | | +1.6 −0.8 | | −40 −56 | | −11.6 −27.0 | |
| Total | 2.2 | | 8 | | 5.2 | | 2.4 | | 16 | | 15.4 | |

Test II

| | a) MELT (invention): | 1-Hexyl-3,7-dimethylxanthine (SK$_7$) +Vitamin D$_3$ Cholesterin +Vitamin A palmitate (encapsulated) | | | | B) MIXTURE (comparison test): components as those of a) | | | | | |
|---|---|---|---|---|---|---|---|---|---|---|---|
| Storage time | SK$_7$ mg | % | Vit.D$_3$ Chol. mg | % | Vit.A—palm. i.u. | % | SK$_7$ mg | % | Vit.D$_3$ Chol. mg | % | Vit.A—palm. i.u. | % |
| Theoretical Starting Value | 50.0 | | 0.050 | | 5000 | | 50.0 | | 0.050 | | 5000 | |

Test II – Continued

| | a) MELT (invention): | 1-Hexyl-3,7-dimethylxanthine (SK₇) +Vitamin D₃ Cholesterin +Vitamin A palmitate (encapsulated) | | | | B) MIXTURE (comparison test): components as those of a) | | | | | |
|---|---|---|---|---|---|---|---|---|---|---|---|
| Storage time | SK₇ mg | % | Vit.D₃ Chol. mg | % | Vit.A–palm. i.u. | % | SK₇ mg | % | Vit.D₃ Chol. mg | % | Vit.A–palm. i.u. | % |
| Value immediately after preparation | 51.0 | +2.0 | 0.046 | −8 | 3930 | −21.4 | 52.3 | +4.6 | 0.032 | −36 | 3930 | −21.4 |
| 6 Months | 48.3 | −3.4 | 0.040 | −20 | 3610 | −27.8 | 48.5 | −3.0 | 0.032 | −36 | 4280 | −14.4 |
| 1 Year | 51.1 | +2.2 | 0.036 | −28 | 3540 | −29.2 | 50.9 | +1.8 | 0.033 | −34 | 3700 | −26.0 |
| 2 Years | 49.0 | −2.0 | 0.037 | −26 | not measured | | 48.6 | −2.8 | 0.027 | −46 | not measured | |
| Loss | | −2.0% | | −26.0% | | −29.2% | | −2.8% | | −46% | | 26.0% |
| Fluctuation Measurement | | +2.2 −3.4 | | −8 −28 | | −21.4 −29.2 | | +4.6 −3.0 | | −34 −46 | | −14.4 −26.0 |
| Total | | 5.6 | | 20 | | 7.8 | | 7.6 | | 12 | | 11.6 |

---

Sample III a) Preparation as melt (according to invention) containing 1-Hexyl-3,7-dimethylxanthine (SK₇), Magnesium nicotinate, Sodium ascorbate, Vitamin B₁, B₂, B₆·HCl, dl-α-Tocopherol succinate and Vitamin A palmitate (encapsulated)

| Storage time | SK₇ mg | % | Magnesium-nicotinate mg | % | Sodium-ascorbate mg | % | Vit.B₁HCl mg | % | Vit.B₂ mg | % | Vit.B₆HCl mg | % | dl-α-Tocoph. succinate mg | % | Vit.A-palm. i.u. | % |
|---|---|---|---|---|---|---|---|---|---|---|---|---|---|---|---|---|
| Theory | 200 | | 50.0 | | 35.0 | | 1.50 | | 2.20 | | 2.40 | | 20.0 | | 2500 | |
| Starting Value | 201.6 | +0.8 | 52.7 | +5.4 | 34.3 | −2.0 | 1.54 | +2.67 | 2.17 | −1.36 | 2.47 | +2.91 | 19.4 | −3.0 | 2032 | −18.7 |
| 6 Months | 219.0 | +9.5 | 50.7 | +1.4 | 34.6 | −1.1 | 1.54 | +2.67 | 2.20 | | 2.12 | −11.70 | 16.5 | −17.5 | 1660 | −33.6 |
| 1 Year | 216 | +8.0 | 45.8 | −8.4 | 32.4 | −7.42 | 1.66 | +10.65 | 2.16 | −1.82 | 2.62 | +9.16 | 15.8 | −21.0 | 1160 | −53.5 |
| 2 Years | 203 | +1.5 | 47.1 | −5.8 | 33.7 | −3.7 | 1.47 | −2.00 | 2.18 | −0.91 | 2.59 | +7.92 | 15.7 | −21.5 | 1060 | −57.6 |
| Loss | | | | −5.8% | | −3.7 | | −2.0% | | −0.91% | | | | −21.5% | | −57.6% |
| Fluctuation Measurement | | +9.5 +0.8 | | +5.4 −8.4 | | −3.7 −7.42 | | +10.65 −2.00 | | −0.91 −1.82 | | +9.16 −11.70 | | −3.0 −21.5 | | −18.7 −57.6 |
| Total | | 8.7 | | 13.8 | | 3.72 | | 12.65 | | 0.91 | | 20.86 | | 18.5 | | 38.9 |

---

Test III b) preparation as mixture (comparison test): containing 1-Hexyl-3,7-dimethylxanthine (SK₇), Magnesium nicotinate, Sodium ascorbate, Vitamin B₁, B₂, B₆·HCl, dl-α-Tocopherol succinate and Vitamin A palmitate (encapsulated)

| Storage time | SK₇ mg | % | Magnesium-nicotinate mg | % | Sodium-ascorbate mg | % | Vit.B₁HCl mg | % | Vit.B₂ mg | % | Vit.B₆HCl mg | % | dl-α-Tocoph. succinate mg | % | Vit.A-palm. i.u. | % |
|---|---|---|---|---|---|---|---|---|---|---|---|---|---|---|---|---|
| Theory | 200 | | 50.0 | | 35.0 | | 1.50 | | 2.20 | | 2.40 | | 20.0 | | 2500 | |
| Starting Value | 220 | +10.0 | 48.7 | −2.6 | 56.0 | +60.0 | 1.47 | −2.0 | 1.08 | −51.0 | 1.06 | −59.9 | 19.0 | −5.0 | 1792 | −28.3 |
| 6 Months | 230 | +15.0 | 57.2 | +14.4 | 24.1 | −31.1 | 1.27 | −15.3 | 1.56 | −31.4 | 1.19 | −50.5 | 14.7 | −26.5 | 2650 | +6.0 |
| 9 Months | 201 | +0.5 | 50.5 | −1.0 | 19.7 | −43.8 | 1.50 | ±0 | 1.18 | −46.4 | 1.79 | −25.4 | 13.5 | −32.5 | 2010 | −19.6 |
| 1 Year | 185 | −7.5 | 50.0 | ±0 | 12.0 | −67.71 | 1.48 | −1.33 | 1.97 | −10.45 | 1.83 | −23.7 | 18.1 | −9.5 | 1680 | −32.8 |
| 2 Years | 207 | +3.5 | 48.4 | −3.2 | 24.1 | −31.1 | 1.31 | −13.9 | 1.91 | −13.2 | 1.62 | −32.5 | 14.0 | −30.0 | 914 | −63.5 |
| Loss | | | | −3.2% | | −31.1% | | −13.9% | | −13.2% | | −32.5% | | −30% | | −63.5% |
| Fluctuation Measurement | | +15.0 −7.5 | | +14.4 −3.2 | | +60.00 −67.71 | | −1.33 −13.9 | | −10.45 −51.0 | | −23.7 −59.9 | | −5.0 −32.5 | | +6.0 −63.5 |
| Total | | 22.5 | | 17.6 | | 127.71 | | 12.57 | | 40.55 | | 36.2 | | 27.5 | | 69.5 |

Sample III c) preparations with an increased amount (stabilizing) of SK₇ as a _melt_, containing 1-Hexyl-3,7-dimethylxanthine (SK₇), Magnesiumnicotinate, Sodium ascorbate, Vitamin $B_1$, $B_2$, $B_6$, dl-α-Tocopherolsuccinate and Vitamin A palmitate (encapsulated)

| Storage time | SK₇ mg | % | Magnesium-nicotinate mg | % | Sodium-ascorbate mg | % | Vit.$B_1$HCl mg | % | Vit.$B_2$ mg | % | Vit.$B_6$ mg | % | dlα-Tocoph. succinate mg | % | Vit.A-palmitate i.u. | % |
|---|---|---|---|---|---|---|---|---|---|---|---|---|---|---|---|---|
| Theory | 300 | | 55.0 | | 42.0 | | 1.65 | | 2.42 | | 2.64 | | 22.0 | | 4000 | |
| Starting value | 308 | +2.67 | 49.7 | -9.65 | 44.7 | +6.43 | 1.63 | -1.2 | 2.42 | 0 | 2.60 | -1.52 | 19.2 | -12.72 | 4810 | +20.2 |
| 6 Months | 320 | +6.67 | 54.4 | -1.09 | 38.1 | -9.30 | 1.63 | -1.2 | 2.34 | -3.3 | 2.70 | +2.27 | 22.3 | +1.36 | 4380 | +9.5 |
| 2Y. 9M. | not measured | | 52.2 | -5.09 | 37.7 | -10.22 | 1.62 | -1.8 | not measured | | 2.59 | -1.90 | not measured | | 4420 | +10.5 |
| Loss | | | | -5.09% | | -10.22% | | -1.8 % | | -3.3 % | | -1.9 % | | | | |
| Fluctuation Measurement | | +2.67 / +6.67 | | -1.09 / -9.65 | | +6.43 / -10.22 | | -1.2 / -1.8 | | 0 / -3.3 | | +2.27 / -1.90 | | +1.36 / -12.72 | | +20.2 / +9.5 |
| Total | | 4.00 | | | | 16.65 | | 0.6 | | 3.3 | | 4.17 | | 14.08 | | 10.7 |

Sample IV a) preparation as a melt, containing 1-Oxohexyl-3,7-dimethylxanthine (BL 191) Magnesiumnicotinate, sodium ascorbate, Vitamin $B_2$, $B_6$.HCl, dl-α-Tocopherol succinate, Vitamin A palmitate (encapsulated)

| Storage time | BL 191 mg | % | Magnesium-nicotinate mg | % | Sodium ascorbate mg | % | Vit.$B_2$ mg | % | Vit.$B_6$HCl mg | % | dlα-Tocoph. succinate mg | % | Vit.A-palmitate i.u. | % |
|---|---|---|---|---|---|---|---|---|---|---|---|---|---|---|
| Theory | 200 | | 50.0 | | 35.0 | | 2.20 | | 2.40 | | 20.0 | | 2500 | |
| Starting value | 201 | +0.5 | 50.9 | +1.8 | 39.8 | +13.7 | 1.90 | -13.62 | 2.33 | -2.91 | 19.8 | -1 | 1910 | -23.6 |
| 6 Months | 216 | +8.0 | 47.9 | -4.2 | 36.2 | +4.0 | 1.98 | -10.00 | 1.99 | -17.05 | 14.1 | -29.5 | 1980 | -20.8 |
| 9 Months | 207 | +3.5 | 48.4 | -3.2 | 35.5 | +1.43 | 1.75 | -20.50 | 2.32 | -3.33 | 15.6 | -22 | 2090 | -16.4 |
| 1 Year | 201 | +0.5 | 50.1 | +0.2 | 36.6 | +4.57 | 1.82 | -17.25 | 1.83 | -23.70 | 17.8 | -11 | 1635 | -34.6 |
| 2 Years | 202 | +1.0 | 50.0 | 0 | 35.4 | +1.14 | 1.60 | -27.30 | 2.33 | -2.91 | 15.8 | -21 | 1150 | -54.0 |
| Loss | | | | | | | | -27.30 % | | -2.91 % | | -21 % | | -54 % |
| Fluctuation Measurement | | +8.0 / +1.0 | | +1.8 / -4.2 | | +13.70 / +1.14 | | -10.00 / -27.30 | | -2.91 / -23.70 | | -1.0 / -29.5 | | -16.4 / -54.0 |
| Total | | 7.0 | | 6.0 | | 12.56 | | 17.30 | | 20.79 | | 28.5 | | 37.6 |

Sample IV b) preparation as a mixture (comparison test), containing 1-Oxohexyl-3,7-dimethylxanthine (BL 191), Magnesium nicotinate, Sodium ascorbate, Vitamin $B_2$, $B_6$.HCl, dl-α-Tocopherol succinate, Vitamin A palmitate (encapsulated)

| Storage time | BL 191 mg | % | Magnesium-nicotinate mg | % | Sodiumascorbate mg | % | Vit.$B_2$ mg | % | Vit.$B_6$HCl mg | % | dlα-Tocoph. succinate mg | % | Vit.A-palmitate i.u. | % |
|---|---|---|---|---|---|---|---|---|---|---|---|---|---|---|
| Theory | 200 | | 50.0 | | 35.0 | | 2.20 | | 2.40 | | 20.0 | | 2500 | |
| Starting Value | 211 | +5.5 | 47.7 | -4.6 | 34.4 | -1.71 | 1.88 | -14.55 | 2.29 | -4.58 | 20.8 | +4.0 | 1910 | -23.6 |
| 6 Months | 233 | +11.5 | 48.5 | -3.0 | 27.9 | -20.30 | 1.91 | -13.19 | 2.30 | -4.71 | 18.0 | -10.0 | 1920 | -23.2 |
| 9 Months | 205 | +2.5 | 48.8 | -2.4 | 30.6 | -12.55 | 1.77 | -19.52 | 1.20 | -50.00 | 16.5 | -17.5 | 2120 | -15.2 |
| 1 Year | 204 | +2.0 | 50.4 | +0.8 | 22.2 | -36.60 | 1.75 | -20.45 | 1.48 | -38.30 | 17.8 | -11.0 | 2440 | -2.4 |
| 2 Years | 206 | +3.0 | 46.5 | -7.0 | 28.3 | -19.12 | 1.42 | -35.40 | 1.50 | -37.50 | 17.6 | -12.0 | 965 | -61.5 |
| Loss | | | | -7.0 % | | -19.12 | | -35.40 % | | -37.50 % | | -12.0 % | | -61.5 % |
| Fluctuation Measurement | | +11.5 / +2.0 | | +0.8 / -7.0 | | -1.71 / -36.60 | | -13.19 / -35.40 | | -4.58 / -50.00 | | +4.0 / -17.5 | | -2.4 / -61.5 |
| Total | | 9.5 | | 7.8 | | 34.89 | | 22.21 | | 45.42 | | 21.5 | | 59.1 |

Sample V a) Commercial preparation: During the manufacture thereof stabilizers were presumably used.

Capsulae containing 7-(β-Hydroxyethyl-1,3-dimethylxanthine, Buphenine.HCl, Vitamin A, Vitamin B$_1$-nitrate, Vitamin B$_2$, Vitamin B$_6$.HCl, Nicotinic acid amide, Vitamin C and Vitamin E-acetate

| Storage time | Vit. C mg | % | Vitamin B$_1$-nitrate mg | % | Vit. B$_2$ mg | % | Vit.B$_6$ HCl mg | % | Tocopherol-acetate mg | % | Vit. A i.u. | % |
|---|---|---|---|---|---|---|---|---|---|---|---|---|
| Theory | 25.0 | | 0.70 | | 0.80 | | 0.70 | | 8.0 | | 1500 | |
| Starting Value | 25.8 | +3.2 | 0.63 | −10.00 | 0.69 | −13.75 | 0.60 | −14.29 | 7.00 | −12.5 | 1555 | − 3.6 |
| 3 Months | 24.8 | −0.8 | 0.75 | + 7.15 | 0.69 | −13.75 | 0.79 | +12.85 | 5.95 | −25.5 | 1335 | −11.0 |
| 6 Months | 26.0 | +4.0 | 0.70 | ± 0 | 0.69 | −13.75 | 0.60 | −14.29 | 4.70 | −41.3 | 1410 | − 6.0 |
| 1 Year | 26.5 | +6.0 | 0.78 | +11.42 | 0.77 | − 4.00 | 0.57 | −18.55 | 7.00 | −12.5 | 1638 | + 9.2 |
| 2 Years | 24.4 | −2.4 | 0.62 | −11.42 | 0.69 | −13.75 | 0.60 | −14.29 | 5.00 | −37.5 | 1550 | + 3.3 |
| Loss | | −2.4% | | −11.42% | | −13.75% | | −14.29% | | −37.5% | | |
| Fluctuation | | +6.0 | | +11.42 | | − 4.00 | | +12.85 | | −12.5 | | + 9.2 |
| Measurement | | −2.4 | | −11.42 | | −13.75 | | −18.55 | | −41.3 | | −11.0 |
| Total | | 8.4 | | 22.84 | | 9.75 | | 31.40 | | 28.8 | | 20.2 |

Sample V
b) Commerical preparation without a Xanthine compound
(During the manufacture of the preparation stabilizers were probably used).

| Storage time | Vitamin C mg | % | Vit.B$_1$ mg | % | Vitamin B$_2$ mg | % | Vitamin B$_6$ mg | % | Tocopherol-acetate mg | % | Vitamin A i.u. | % |
|---|---|---|---|---|---|---|---|---|---|---|---|---|
| Theory | 50.0 | | 1.00 | | 1.50 | | 2.00 | | 2.00 | | 2000 | |
| 3 Months | 51.7 | +3.4 | 0.92 | − 8 | 1.59 | + 6.00 | 2.15 | + 7.5 | 1.49 | −25.5 | 2680 | +32.0 |
| 6 Months | 50.7 | +1.4 | 1.07 | + 7 | 1.20 | −20.00 | 2.01 | + 0.5 | 1.57 | −21.5 | 2170 | + 8.5 |
| 1 Year | 52.8 | +5.6 | 1.14 | +14 | 1.53 | + 2.0 | 1.75 | −12.5 | 1.88 | − 6.0 | 1890 | − 5.5 |
| 2 Years | 52.7 | +5.4 | 0.80 | −20 | 1.48 | − 1.34 | 1.98 | − 1.0 | 1.54 | −23.0 | 2260 | +13.0 |
| Loss | | | | −20% | | −1.34% | | −1.0% | | −23.0% | | |
| Fluctuation | | +5.6 | | +14 | | + 6.0 | | + 7.5 | | − 6.0 | | +32.0 |
| Measurement | | +1.4 | | −20 | | −20.0 | | −12.5 | | −25.5 | | − 5.5 |
| Total | | 4.2 | | 34 | | 26.0 | | 20.0 | | 19.5 | | 37.5 |

Discussion of the results

The comparison of sample I shows that vitamin D$_3$ has a much better stability in the melt according to the invention than in the mixture wherein it shows a loss of 50 %. The same effect is shown in sample II wherein the loss of vitamin D$_3$ cholesterine in the comparison mixture (b) is 46 % while the analogous value of the melt is only 26 %.

Comparing sample IIIa) with IIIb) it is seen that the sodium ascorbate, vitamin B$_2$, tocopherol succinate and vitamin A palmitate show substantial fluctuations in values which are essentially higher than the fluctuation of the corresponding values of the same substances of sample IIIa) (cf. especially vitamin B$_6$.HCl). Furthermore, the loss of sodium ascorbate, vitamin B$_1$.HCl, vitamin B$_2$ and of tocopherol succinate in sample IIIb) is much higher than the loss of the same substances of sample IIIa) (cf. especially that of sodium ascorbate).

In sample IIIc) the increased stabilizing amount of 1-hexyl-3,7-dimethylxanthine results in an improvement in the fluctuation measurement compared with the corresponding values of sample IIIa). Furthermore, it is seen that, generally, the stabilisation of the components is superior to that of sample IIIa) and substantially better than that of *) sample IIIc) for sodium ascorbate and vitamin B$_1$.HCl. In sample IIIc) the sensible vitamin A palmitate shows good stabilisation which is very much improved compared with that of samples IIIa) and b).

*) sample IIIb), compare especially the loss values of sample IIIb) and B$_2$ and B$_6$.HCl is effected. Contrary thereto the stabilization and the homogeneity in sample IVb) are inferior to those of sample IVa).

Sample IVa) shows that also with 1-oxohexyl-3,7-dimethylxanthine a stabilization of the magnesium nicotinate, sodium ascorbate, vitamin In sample Va), which is a commercial product the average fluctuation measurement and the loss are higher than those for the corresponding substances in preparations IIIa) and IVa) according to the invention, especially those for vitamin C and vitamin B$_1$ nitrate of sample Va). In sample Vb) the values of the fluctuation measurement are also higher than the corresponding values of samples IIIa) and c) which are according to the invention.

Summary of the comparison tests

The preceding experiment results show that the stability of the vitamins in the samples prepared according to the invention is substantially higher than the stability of the vitamins in simple mixtures. In the experiments, most of which where performed in the course of 2 years and in one case even two years and 9 months, a lower loss of activity is generally obtained. For several substances this difference between the activity of the samples according to the invention and the comparison samples is important. Thus, according to the tables there is a distinct stabilizing effect for vitamin $D_3$ cryst. and $D_3$ cholesterine, sodium ascorbate, $B_1$, $B_2$ and $B_6$. Furthermore, a stabilizing effect is evident from the fat soluble vitamins, e.g., vitamins A and E, although the limits of error of analysis are rather high as it is known, especially if those vitamins are present. The fact that nearly all samples (excepted the value of example IIa) according to the invention show better final and average values than the corresponding comparison samples (which are only mixtures) indicates a stabilisation. Such an improvement also apears if the vitamins are used in an encapsulated form, such as vitamin A palmitate, which is a liquid substance and therefore it may be correctly dosed only in this form.

As is evident from the tables the values for the mixtures (comparison samples) show essentially higher fluctuations than the corresponding values for the preparations according to the invention. These fluctuations are not caused by variations of analysis values within the limits of error, but by fluctuations of the homogeneity and dispersion in the samples which were taken for the analysis. Therefrom the various positive values are explained. The remarkable positive values for vitamin A palmitate in sample IIIc) may essentially be caused by the relatively high limit of error in this case. Only the starting value indicates an nonhomogeneity. By sample IIIa) it is shown that the stability may substantially improved by an increased amount of xanthine derivatives. The positive values for sodium ascorbate in sample IVa) are — except the starting value of + 13.7 which is caused by an nonhomogeneity — also within the usual limits of analysis deviation which in general is up to 10 % for the vitamins other than the above-mentioned fat soluble vitamins.

Vitamin C as used in preparation Va) is comparable with the sodium ascorbate while vitamin $B_1$ nitrate is more stable than the chlorohydrate as used in the comparison test. In spite of the use of this more unstable chlorohydrate in samples IIIa) and IIIc) no decrease in effectiveness is shown. Contrary thereto, the fluctuation measurement which is a measure of homogeneity is in this commercial product Va) as high as in the comparison mixtures.

The test results distinctly show that, by the process according to the invention, stabilized and unstabilized vitamins are present in the preparations with an essentially improved homogeneity, compared with known commercial products or comparison mixtures. This is of special importance for microencapsulated oils, e.g., vitamins A and E, as these vitamins in the form of small pellets tend very much to a separation.

What we claim is:

1. A therapeutically-active and pharmaceutically-acceptable solidified homogeneous intimate admixture of
   a. at least one pharmaceutically-active substance and
   b. at least one molten pharmaceutically-active substance; at least one active substance of which is more rapidly and at least one of which is more slowly absorbable;
   the solidified homogeneous admixture comprising, as two of the pharmaceutically-active substances:
   I. a xanthine which is substituted in each of two of the 1-, 3- and 7-positions by an alkyl group having at most two carbon atoms and is substituted in the remaining of said positions by:
      a. a hydrocarbon group having from 3 to 20 carbon atoms and being bound by an acyclic carbon atom which is part of such group, or
      b. an aliphatic hydrocarbon group substituted by at least one substituent selected from the group consisting of hydroxy and oxo, the hydrocarbon group having from 6 to 20 carbon atoms, being saturated or olefinically unsaturated, and being bound by an acyclic carbon atom which is part of such group; and
   II. a member selected from the group consisting of nicotinic acid, a therapeutically-active derivative of nicotinic acid, an unstable vitamin and a therapeutically-active equivalent thereof selected from the group consisting of a salt, an ester and a provitamin thereof;
   the xanthine being present in the admixture in a proportion sufficient to stabilize any unstable vitamin therein.

2. A therapeutically-active and pharmaceutically-acceptable preparation comprising a solidified admixture according to claim 1 wherein the xanthine is substituted in one of the 1-, 3- and 7-positions by:
   a. alkyl having from 5 to 15 carbon atoms,
   b. phenyl-substituted saturated aliphatic hydrocarbon,
   c. hydroxyalkyl having from 7 to 15 carbon atoms or
   d. oxoalkyl having from 7 to 15 carbon atoms.

3. A delayed release therapeutically-active and pharmaceutically-acceptable preparation comprising an admixture according to claim 1 which consists essentially of said pharmaceutically-active substances, at least one of which is more rapidly and at least one of which is more slowly therapeutically active, at least one therapeutically active substance being homogeneously incorporated in another, both being intimately mixed, the said at least two active substances being physiologically acceptable and pharmaceutically as well as chemically compatible under the conditions of the homogeneous incorporation and having activities which are not antagonistic.

4. A delayed release therapeutically-active and pharmaceutically-acceptable preparation comprising an admixture according to claim 1 and wherein one of the pharmaceutically-active substances is nicotinic acid or a therapeutically-active derivative thereof.

5. A delayed-release pharmaceutically-acceptable preparation according to claim 4 wherein the admixture consists essentially of a solidified intimate admixture of
   a. at least one member selected from the group consisting of nicotinic acid and a therapeutically-active derivative thereof and
   b. molten 1-hexyl-3,7-dimethylxanthine.

6. A pharmaceutically-acceptable stabilized vitamin preparation comprising an admixture according to claim 1 and wherein one of the pharmaceutically-active substances is an unstable vitamin stabilized by the xanthine.

7. A preparation according to claim 6 wherein one of the pharmaceutically-active substances is an unstable vitamin stabilized by the xanthine, wherein the xanthine is present in an excess and wherein the vitamin is homogeneously distributed in said xanthine in the form of an intimate solid mixture of these components.

8. A delayed-release pharmaceutically-acceptable stabilized vitamin preparation according to claim 6 wherein the admixture consists essentially of a solidified intimate admixture of
   a. at least one absorbable therapeutically-active vitamin selected from the group consisting of vitamin A, vitamin $B_1$, vitamin $B_6$, vitamin C and vitamin E and
   b. an effective vitamin-stabilizing amount of molten 1-hexyl-3,7-dimethylxanthine.

9. A delayed-release pharmaceutically-acceptable stabilized vitamin preparation according to claim 6 wherein the admixture consists essentially of a solidified intimate admixture of
   a. at least one absorbable therapeutically-active vitamin selected from the group consisting of vitamin A, vitamin $B_1$, vitamin $B_2$, vitamin $B_6$, vitamin C, vitamin $D_3$ and vitamin E and
   b. an effective vitamin-stabilizing amount of molten 1-hexyl-3,7-dimethylxanthine.

10. A preparation according to claim 6 comprising a combination of at least one vitamin stabilized with at least one pharmacologically-acceptable substituted xanthine which is substituted in each of two of the 1-, 3- and 7-positions by an alkyl group having at most 2 carbon atoms and is substituted in the remaining of said positions by
   a. an aliphatic unsubstituted hydrocarbon group with from 3 to 20 carbon atoms and which is saturated or contains at most 3 olefinic bonds,
   b. substituted (a), at least one substituent of which is a member selected from the group consisting of
   1. hydroxy,
   2. oxo,
   3. phenyl and
   4. cycloalkyl with from 5 to 7 ring atoms,
   each substituted hydrocarbon group having, altogether, at most 20 carbon atoms and
wherein each substituent of the xanthine is bound thereto by an acyclic carbon atom which is part thereof; in which combination the xanthine compound is present in an excess and wherein the vitamin is homogeneously distributed in said substituted xanthine compound in the form of an intimate solid mixture of these components.

11. In a process for producing a pharmaceutical preparation exhibiting delayed release of an active substance, the improvement which consists essentially of:
   a. intimately mixing at least two therapeutically-active and pharmaceutically-acceptable substances, at least one of which is more rapidly absorbable than another and at least one of which is in molten state, each other therapeutically-active substance being homogeneously incorporated into any such substance in molten state;
   b. solidifying the resulting admixture and
   c. forming the solidified admixture into a solid pharmaceutical preparation wherein each therapeutically-active substance is homogeneously admixed with each other such substance, and all active substances are compatible for concurrent administration;
   two of the therapeutically-active and pharmaceutically-acceptable substances being:
   I. a xanthine which is substituted in each of two of the 1-, 3- and 7-positions by an alkyl group having at most two carbon atoms and is substituted in the remaining of said positions by:
      a. a hydrocarbon group having from 3 to 20 carbon atoms and being bound by an acyclic carbon atom which is part of such group, or an aliphatic hydrocarbon group substituted by at least one substituent selected from the group consisting of hydroxy and oxo, the hydrocarbon group having from 6 to 20 carbon atoms, being saturated or olefinically unsaturated, and being bound by an acyclic carbon atom which is part of such group; and
   II. a member selected from the group consisting of nicotinic acid, a therapeutically-active derivative of nicotinic acid, an unstable vitamin and a therapeutically-active equivalent thereof selected from the group consisting of a salt, an ester and a provitamin thereof;
   the xanthine being present in the admixture in a proportion sufficient to stabilize any unstable vitamin therein.

12. A process according to claim 11 wherein non-liquid therapeutically-active substances absorbable at different rates are intimately mixed under pressure.

13. A process according to claim 11 wherein the therapeutically-active substances comprise at least one unstable vitamin or a therapeutically-active equivalent thereof.

14. A process according to claim 11 wherein the therapeutically-active substances comprise nicotinic acid or a therapeutically-active derivative thereof.

15. A process according to claim 11 wherein the molten and solidified admixture is granulated and filled into capsules, or extruded under pressure into shaped tablet dosage forms.

16. A process according to claim 11 wherein the therapeutically-active substances are:
   a. from 50 to 200 parts by weight of an alkyldimethylxanthine and
   b. from 10 to 50 parts by weight of nicotinic acid or a salt thereof.

17. A process according to claim 11 wherein the solidified admixture resulting from step (b) consists essentially of said therapeutically-active substances.

18. A process according to claim 11 wherein one of the therapeutically-active substances is a xanthine which is substituted in each of two of the 1-, 3- and 7-positions by an alkyl group having at most 2 carbon atoms and is substituted in the remaining of said positions by
   a. an aliphatic unsubstituted hydrocarbon group with from 3 to 20 carbon atoms and which is saturated or olefinically unsaturated with at most 3 olefinic bonds,
   b. substituted (a), at least one substituent of which is a member selected from the group consisting of
   1. hydroxy,
   2. oxo,
   3. phenyl and
   4. cycloalkyl with from 5 to 7 ring atoms,
   each substituted hydrocarbon group having, altogether, at most 20 carbon atoms and
wherein each substituent of the xanthine is bound thereto by an acyclic carbon atom which is part thereof.

19. A process according to claim 11 for producing a pharmaceutically-acceptable vitamin preparation exhibiting delayed release of active vitamin substance and which process consists essentially of:
  a. intimately mixing an effective vitamin-stabilizing amount of a molten dimethylxanthine compound selected from the group consisting of 1-hexyl-3,7-dimethylxanthine, 1-oxohexyl-3,7-dimethylxanthine, and 7-(β-hydroxyethyl)-1,3-dimethylxanthine with at least one absorbable therapeutically-active vitamin substance selected from the group consisting of nicotinic acid, vitamin A, vitamin $B_1$, vitamin $B_2$, vitamin $B_6$, vitamin C, vitamin $D_3$ and vitamin E;
  b. solidifying the obtained mixture; and
  c. forming the solidified mixture into a solid vitamin pharmaceutical preparation.

20. A process according to claim 19 wherein the dimethylxanthine is 1-oxohexyl-3,7-dimethylxanthine.

21. A process according to claim 19 wherein the dimethylxanthine is 7-(β-hydroxyethyl)-1,3-dimethylxanthine.

22. A process according to claim 19 wherein the dimethylxanthine is 1-hexyl-3,7-dimethylxanthine.

23. A vitamin stabilization process which comprises:
  a. intimately mixing at least two pharmacologically-acceptable components, one such component comprising at least one unstable vitamin and another such component comprising an effective vitamin-stabilizing amount of at least one substituted xanthine,
  the xanthine being substituted in each of two of the 1-, 3- and 7-positions by an alkyl group having at most two carbon atoms and being substituted in the remaining of said positions by:
    1. a hydrocarbon group having from 3 to 20 carbon atoms and being bound by an acyclic carbon atom which is part of such group, or
    2. an aliphatic hydrocarbon group substituted by at least one substituent selected from the group consisting of hydroxy and oxo, the hydrocarbon group having from 6 to 20 carbon atoms, being saturated or olefinically unsaturated, and being bound by an acyclic carbon atom which is part of such group,
  at least 50 percent by weight of the total comprised of each vitamin and each substituted xanthine being in molten state in which any remainder of the components is homogeneously incorporated, and the substituted xanthine being in excess; and
  b. solidifying the resulting admixture into substantially solid state.

24. A process according to claim 23 wherein the vitamin is at least one member selected from the group consisting of vitamin A, vitamin C, vitamin E and a vitamin of the B-vitamins.

25. A vitamin stabilization process according to claim 23 which comprises:
  A. intimately mixing at least two pharmacologically-acceptable components, one such component comprising at least one unstable vitamin and another such component comprising at least one substituted xanthine, which is substituted in each of two of the 1-, 3- and 7-positions by an alkyl group having at most 2 carbon atoms and is substituted in the remaining of said positions by
    a. an aliphatic unsubstituted hydrocarbon group with from 3 to 20 carbon atoms and which is saturated or contains at most 3 olefinic bonds,
    b. substituted (a), at least one substituent of which is a member selected from the group consisting of
      1. hydroxy,
      2. oxo,
      3. phenyl and
      4. cycloalkyl with from 5 to 7 carbon atoms,
    each substituted hydrocarbon group having, altogether, at most 20 carbon atoms and
  wherein each substituent of the xanthine is bound thereto by an acyclic carbon atom which is part thereof at least 50 percent by weight of the total comprised of each vitamin and of each substituted xanthine is in molten state in which any remainder of the components is homogeneously incorporated, and the substituted xanthine is in excess;
  B. solidifying the resulting admixture into substantially solid state.

26. A process according to claim 25 wherein the vitamin is vitamin A, vitamin C, vitamin E, a vitamin of the B-vitamins, a vitamin of the D-vitamins, or a combination thereof.

27. A process according to claim 25 wherein the vitamin/substituted-xanthine ratio is at most 30 percent by weight.

28. A process according to claim 25 for producing a pharmaceutically-acceptable stabilized vitamin preparation, which process consists essentially of intimately mixing an effective vitamin-stabilizing amount of molten 1-hexyl-3,7-dimethylxanthine with at least one absorbable therapeutically-active vitamin substance selected from the group consisting of vitamin A, vitamin $B_1$, vitamin $B_2$, vitamin $B_6$, vitamin C, vitamin $D_3$ and vitamin E, solidifying the obtained mixture and forming it into a solid stabilized vitamin pharmaceutical preparation.

* * * * *

PO-1050
(5/69)

UNITED STATES PATENT OFFICE
CERTIFICATE OF CORRECTION

Patent No. 3,864,469      Dated February 4th, 1975

Inventor(s) Mario Reiser; Lothar Nook and Emil Eidebenz    Page 1 of 2

It is certified that error appears in the above-identified patent and that said Letters Patent are hereby corrected as shown below:

Column 2, line 63, "e.g." should read --e.g.,--; line 64, β-hydroxyethyl, 5-hydroxyhexyl" should read --5-hydroxyhexyl--. Column 3, line 35, "dimethylxanthine*)" should read --dimethylxanthine or other dimethylxanthine derivatives--; line 58, "* or other dimethylxanthine derivatives" should be omitted. Column 4, line 10, "*)" should read --parts by weight each.--; line 31, "*) parts by weight each." should be omitted. Column 5, line 9, "as" should read --as well as--. Column 6, line 51, "in to" should read --into--. Column 10, line 28, "16" should read --13--. Column 11, line 4, "16 to 18" should read --13 to 15--. Column 15, about line 41, in the row designated "Loss", "-3.7" should read -- -3.7%--. Column 16, about line 24, "dimethylxanthing" should read --dimethylxanthine--. Column 17, about line 18, in the row designated "Total", below "-9.65" the blank space should read --8.56--. Columns 19 and 20, line 1, "Sample V" should read --Sample V (for comparison)--; about line 23, "Sample V" should read --Sample V (for comparison)--. Column 19, about line 33, in the row designated "Loss", " - " should read -- -1.34%--;
                              1.34%
line 65, "*)" should read --sample IIIb), compare especially the loss values of sample IIIb) and--. Column 20, about line 33, in the row designated "Loss", " - " should read -- -1.0%--; lines
                              1.0%
43 to 45, "*) sample IIIb), compare ... those of sample IVa)." should be omitted; line 48, "vitamin" should read --vitamin $B_2$ and $B_6 \cdot HCl$ is effected. Contrary thereto the stabilization and the homogeneity in sample IVb) are inferior to those of sample IVa).--. Column 21, line 28, "may" should read --may be--; line 32, "by an" should read --by--. Column 24, lines 3 to 6, "a. a hydrocarbon ... substituted by at" should read -- a. a hydrocarbon group having from 3 to 20 carbon atoms and being bound by an acyclic carbon atom which is part of such group, or
b. an aliphatic hydrocarbon group substituted by at--.

UNITED STATES PATENT OFFICE
CERTIFICATE OF CORRECTION

Patent No. 3,864,469  Dated  February 4th, 1975

Inventor(s) Mario Reiser; Lothar Nook and Emil Eidebenz    Page 2 of 2

It is certified that error appears in the above-identified patent and that said Letters Patent are hereby corrected as shown below:

Column 25, line 7, ", 1 -oxohexyl" should read --and 1-oxohexyl--; lines 8 and 9, "thine, ... dimethylxanthine" should read --thine--; lines 19 to 21, "21. A process ... 1,3-dimethylxanthine." should be omitted.

Signed and Sealed this

Seventeenth Day of August 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,864,469       Dated  February 4, 1975

Inventor(s)   REISER ET AL.

It is certified that error appears in the above-identified patent and that said Letters Patent are hereby corrected as shown below:

Column 5, line 60, "milk, protein" should read --milk protein --.

Signed and Sealed this

Fifteenth Day of November 1977

[SEAL]

Attest:

RUTH C. MASON
Attesting Officer

LUTRELLE F. PARKER
Acting Commissioner of Patents and Trademarks